(12) United States Patent
Goodman et al.

(10) Patent No.: US 6,876,708 B1
(45) Date of Patent: Apr. 5, 2005

(54) METHOD AND APPARATUS FOR DEMODULATION OF PHASE SHIFT KEYED SIGNALS

(75) Inventors: William L. Goodman, Los Altos Hills, CA (US); Mark Sweeny, Belmont, CA (US)

(73) Assignee: Gas Research Institute, Des Plaines, IL (US)

( * ) Notice: Subject to any disclaimer, the term of this patent is extended or adjusted under 35 U.S.C. 154(b) by 741 days.

(21) Appl. No.: 09/677,284

(22) Filed: Oct. 2, 2000

(51) Int. Cl.[7] .......................... H03D 3/22; H04L 27/22; H04L 27/10; H04L 27/18
(52) U.S. Cl. ...................... 375/329; 375/279; 375/223; 375/308
(58) Field of Search ................................ 375/279, 329, 375/223

(56) References Cited

U.S. PATENT DOCUMENTS

| | | | | |
|---|---|---|---|---|
| 4,763,331 A | * | 8/1988 | Matsumoto | ................. 714/759 |
| 4,980,682 A | | 12/1990 | Klein et al. | |
| 5,297,172 A | * | 3/1994 | Shenoy et al. | ............... 375/371 |
| 5,625,652 A | * | 4/1997 | Petranovich | ................ 375/355 |
| 5,912,930 A | | 6/1999 | Iwasaki | |
| 5,966,401 A | * | 10/1999 | Kumar | ....................... 375/150 |
| 6,084,932 A | * | 7/2000 | Veintimilla | ................. 375/355 |
| 6,088,337 A | * | 7/2000 | Eastmond et al. | .......... 370/280 |
| 6,466,566 B1 | * | 10/2002 | De Gaudenzi et al. | ..... 370/342 |

* cited by examiner

Primary Examiner—Stephen Chin
Assistant Examiner—Harry Vartanian
(74) Attorney, Agent, or Firm—Mark E. Fejer

(57) ABSTRACT

A method for demodulation of a phase shift keyed signal in which the phase shift keyed signal is converted into a plurality of successive outputs, each of which is representative of a phase and amplitude of the phase shift keyed signal over additional sets of windows and carrier phases. Each said additional set has a different offset in time and carrier phase from the other additional sets of windows and carrier phases. The carrier phase and window offsets of the phase shift keyed signal are estimated using the plurality of successive outputs. The phase shift keyed signal is then decoded back into digital data using the estimates.

9 Claims, 2 Drawing Sheets

METHOD AND APPARATUS FOR DEMODULATION OF PHASE SHIFT KEYED SIGNALS

BACKGROUND OF THE INVENTION

1. Field of the Invention

This invention is related to a method and apparatus for decoding borehole telemetry signals transmitted by means of either a magnetic or electric dipole antenna. More particularly, this invention relates to a method and apparatus for synchronizing a receiver time base to that of the transmitter so as to enable the decoding of phase shift keyed (PSK) signals.

2. Description of Prior Art

The problem of decoding borehole telemetry signals is unusual in that the bandwidth is a large fraction of the carrier frequency, the bit rate is very low, and the signal to noise ratio is poor at the limits of range. Phase shift keying is well known, and it has long been known that the optimal means, from a signal to noise point of view, to transmit binary data over a noisy channel is to utilize 180-degree phase shifts. Phase shift is defined with respect to a constant frequency carrier. The transmitted data consists of a string of binary bits with which a time period (window) for each bit is associated. FIG. 1 is illustrative of phase shift keyed modulation. Shown is a phase shift keyed waveform, a carrier and the binary bits being transmitted. As shown, time is divided into windows, one for each bit. The sign of the waveform changes sign if the bit changes. A "1" corresponds to the case where the signal has the same phase as the carrier, while a "0" is transmitted by sending the signal with a phase 180 degrees away from that of the carrier. Correct demodulation of the phase shift keyed signal requires that the carrier and windows be known.

One known approach to the decoding of phase shift keyed signals is based upon a phase locked loop (PLL). Use of a phase locked loop in phase shift keyed decoding is complicated by the fact that the phase is reversed when the bits change. Thus, the signal must be multiplied by the demodulated bit so that it always has the same sign as the carrier before being fed to the phase locked loop. This is shown in FIG. 4. Using the known decoder shown in FIG. 4, the error signal is mixed with the oscillator output with 90-degree phase shift added. When the circuit is locked onto a signal, the error signal is very small and reflects small deviations of the oscillator from a perfect phase match. This error signal is filtered and fed into the voltage controlled oscillator (VCO) in order to maintain the lock. A second channel with the carrier not phase shifted is used to obtain the bit values. The binary bit stream can be obtained by means of a comparator to determine the sign of the signal. This method has the obvious problem that the bits are needed to demodulate the signal and to maintain lock, but the bits cannot be obtained before lock is attained. Such a method works well for tracking a signal once the phase locked loop is locked onto it; however, circuits of this kind are poor at acquiring lock and can be unlocked by noise.

Another known means for determining the carrier of a 180-degree modulated signal is to first square the signal, which removes the phase and coding information and leaves the second harmonic of the carrier. This can be locked onto by means of a simple phase locked loop or other conventional means. In principle, this latter approach can work well, but in practice, it is often complicated. The squaring operation is non-linear and noise from every part of the input signal appears at the carrier frequency. To obtain reasonable performance, the signal must be carefully filtered prior to squaring and the narrow band carrier must still be extracted from the squared signals and the windows determined. In the practical case, frequency distortion of the signal will cause the squared signal to broaden, as the phase information will no longer be totally suppressed. The carrier signals determined by this means tend to have more noise than that determined by a phase locked loop circuit which is locked onto the signal. As taught by U.S. Pat. No. 5,912,930, one approach is to first acquire lock by means of the second harmonic, or similar means independent of the bit stream, and then switch over to a phase locked loop-based scheme to maintain lock.

SUMMARY OF THE INVENTION

It is one object of this invention to provide a method and apparatus for decoding of phase shift keyed signals which is operable under low signal to noise conditions.

It is another object of this invention to provide a method for the decoding of borehole telemetry signals where the bandwidth is a large fraction of the carrier frequency, the bit rate is very low, and the signal to noise ratio is poor at the limits of range.

These and other objects of this invention are addressed by a method for demodulation of phase shift keyed signals comprising the steps of converting the phase shift keyed signal into a plurality of successive outputs, each of which is representative of a phase and amplitude of the phase shift keyed signal over additional sets of windows and carrier phases, where each said additional set has a different off-setting time and carrier phase from other said additional sets of windows and carrier phases. The carrier phase and window offsets of the phase shift keyed signal are estimated using the plurality of successive outputs. The phase shift keyed signal is then decoded back into digital data using such estimates.

The method of this invention enables acquisition of the lock more quickly under low signal to noise condition as well as the maintenance of locks. The method makes use of the fact that the signal is divided into windows of known length to attain lock, while other methods, such as squaring the signal to attain the second harmonic, do not. Any noise which does not fit the signal description is kept from effecting the result, as a result of which the method performs better under low signal to noise conditions. Finally, this method determines the windows as well.

An apparatus suitable for use in carrying out the method of this invention is a digital communication system having a transmitter for transmitting information in the form of a phase shift keyed signal, which signal is divided into a plurality of windows, each of which is offset in time, and a receiver for receiving the information. The apparatus includes a demodulator comprising conversion means for converting the phase shift keyed signal into a plurality of successive outputs, each of which is representative of a phase and amplitude of the phase shift keyed signal over additional sets of windows and carrier phases, and each said additional set having different offsets in time and the carrier phase from the other said additional sets; estimation means for using the plurality of signals to estimate the carrier phase and the window offsets of the phase shift keyed signal; and decoding means for decoding the phase shift keyed signal back into digital data using the estimates.

BRIEF DESCRIPTION OF THE DRAWINGS

These and other objects and features of this invention will be better understood from the following detailed description taken in conjunction with the drawings wherein:

FIG. 2a is a theoretically computed curve, whereas FIG. 2b is an example based upon experimental data;

DETAILED DESCRIPTION OF THE PRESENTLY PREFERRED EMBODIMENTS

As previously indicated, the decoding of phase shift encoded telemetry requires that the receiver know the phase of the transmitter. This can be done by locking onto the phase and tracking it.

Actual decoding of phase shift keyed signals is carried out by the computation of a set of values called bit values. The bit value for a given window is the average of the carrier times the signal. A binary numeral 1 will give rise to a positive bit value while a binary numeral 0 will give rise to a negative bit value. The bit values can easily be computed by analog or digital means, but the carrier and windows need to be known.

Figure 3:
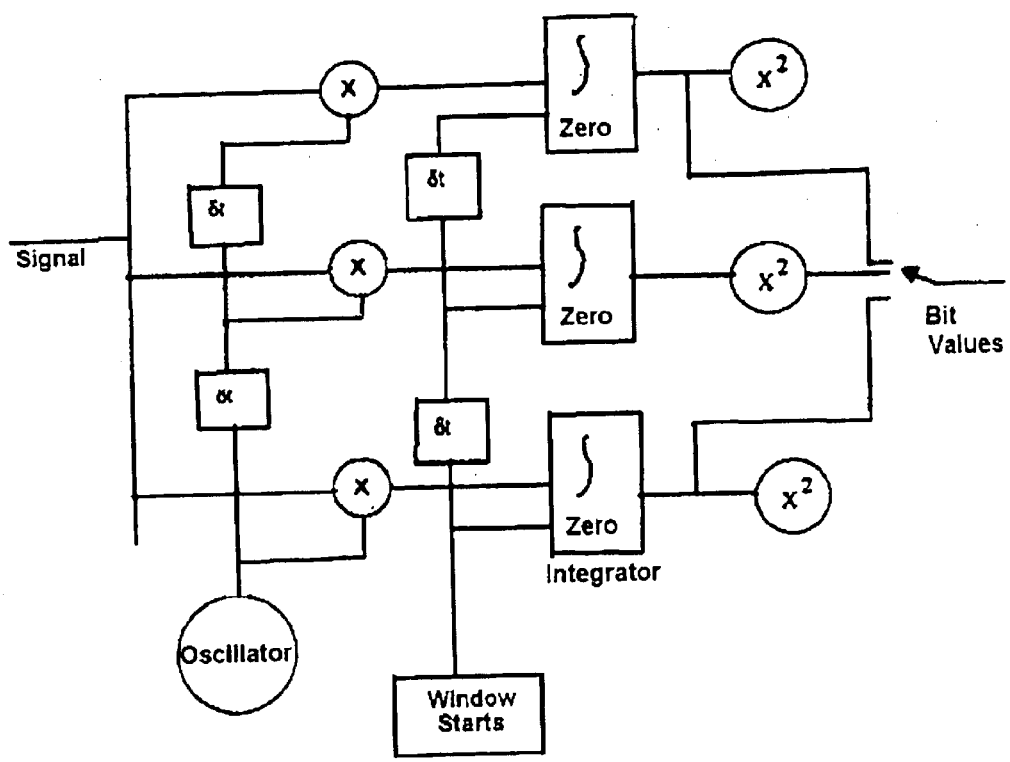
FIG. 3 is a diagram illustrating the method for attaining and maintaining lock in accordance with the method of this invention.
Figure 4:
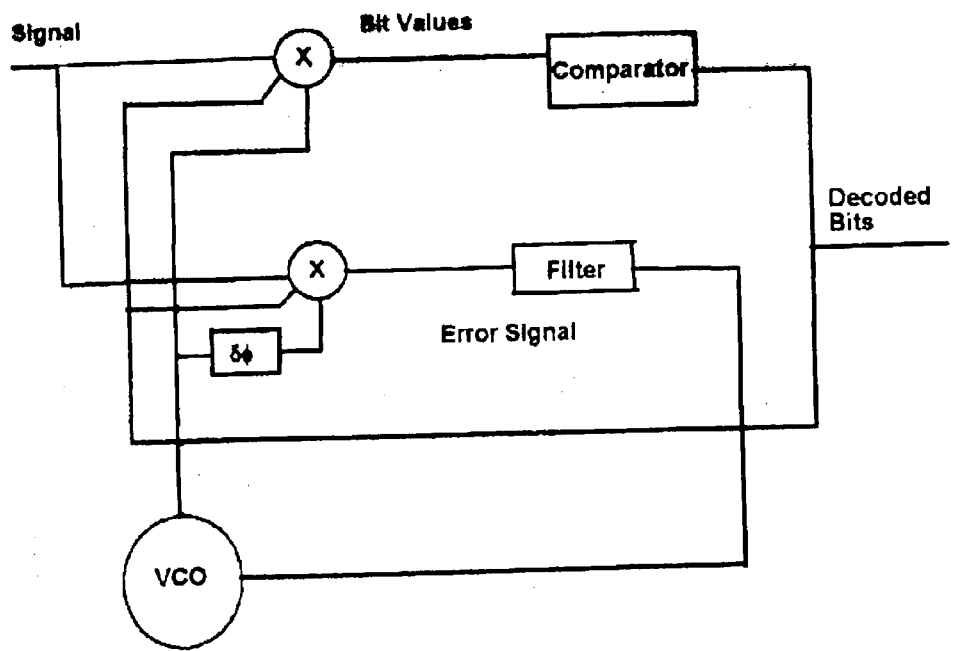
FIG. 4 is a diagram of a typical example of a decoder known to those skilled in the art.

The essence of this invention is that one can calculate a set of possible data streams, one for each of several possible transmitter time bases and then pick the best one according to criteria of signal strength and data integrity. FIG. 3 is a diagram showing synchronization and decoding of phase shift keyed signals in accordance with the method of this invention. As shown therein, a signal is fed into a set of channels which are identical except that phase shifts are added to the carrier and corresponding time delays which indicate the start of new windows. In each channel, the signal is first multiplied by the phase-shifted carrier to partially demodulate it. The signal is then averaged, or integrated, over the window. At the end of the window, the average is read out and the integrator is reset to zero. Because the bit values are bipolar, the squares of the bit values are used to indicate the best fits. A running average of the squares is maintained for a preceding time period and the bit stream corresponding to the largest running average is selected for generating the final bit stream. The final bit stream is usually going to be obtained from the bit values by using a comparator to detect the sign of the value. In some implementations, especially when there are only a small number of candidate bit values, the decoded stream can be optimized by varying the oscillator phase and the window timing.

Figure 1:
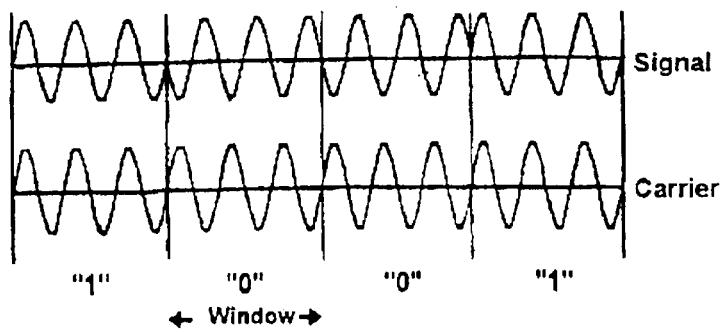
FIG. 1 is a diagram illustrating phase shift keyed modulation.
Figure 2A:
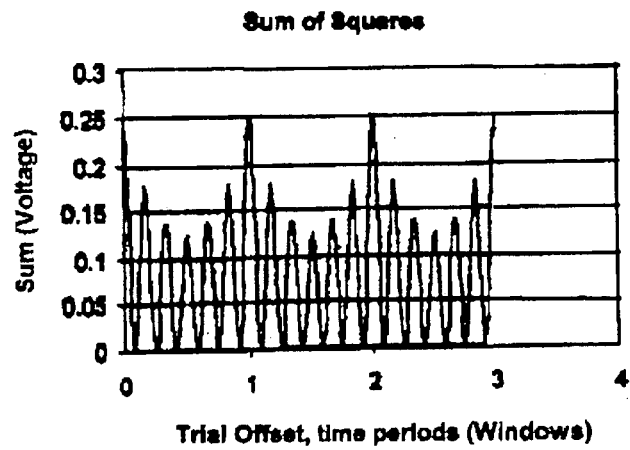
FIGS. 2a and 2b illustrate the use of the sum of the squares of the bit values to determine the window offset.
Figure 2B:
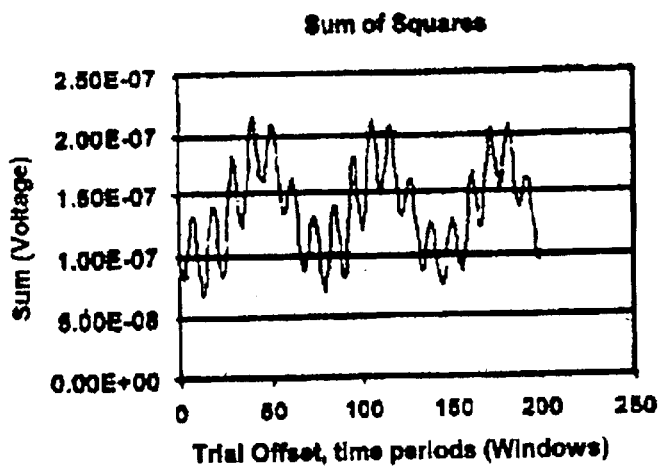

FIGS. 2a and 2b show the actual values of the running averages versus time delay based on theoretical and experimental data, respectively. The rapid oscillations in the averages are due to the change in relative phase between the carrier and the phase of the candidate bit value carrier. The maximal value of the sum occurs when the candidate windows are the same as the actual window. The theoretical curves assume a very large number of sample points with a random distribution of bit values. The curves obtained from real signals will depart from the theoretical averages due to the presence of noise and the fact that they are sums over a finite set of windows. The actual data will influence the shape of the curves. In some cases, it may not be clear which maximum is best, and in this case, the data integrity can be used to select the best bit stream. In essence, error correcting codes and checksums will often be used and this allows one to measure the bit error rate. It should also be noted that the sign of the carrier depends upon the relative orientations of the transmitter and the receivers and may need to be determined by looking at the bit error rates.

As previously indicated, the method of this invention involves the measurement of a distribution of bit values received for a set of possible window offsets and carrier phases based upon which the most likely window offset and carrier phase are selected. In accordance with one embodiment of the method of this invention, the most likely window offset and carrier phase are selected by choosing those which maximize the sum of an increasing function of an absolute value of the bit values. In accordance with another embodiment of this invention, the most likely window offset and carrier phase are selected by choosing those which maximize the sum of the squares of the bit values. In accordance with yet a further embodiment of this invention, the most likely window offset and carrier phase are selected by choosing those which maximize the sum of the absolute values of the bit values. In accordance with yet another embodiment of this invention, the most likely window offset and carrier phase are selected by choosing those which minimize the bit error rate. Yet another embodiment involves the selection of the most likely window offset and carrier phase by comparing a sum of the squares of the bit values to a theoretical value.

Data has been obtained from a ¼-scale magnetic antenna. Algorithms based upon those described herein were used to capture and track the carrier phase and window offset. Table 1 shows the overall bit error rate at several depths and FIG. 2b shows the sum of the squares of the bit values for a section of the data obtained at the deepest depth.

TABLE 1

Signal Strengths and Bit Error Rates

| Depth (ft.) | Signal Strength (measured) (pT) (µV) | Signal Strength Without Casing (pT) (µV) | Error Rate |
| --- | --- | --- | --- |
| 1260 | 1.05 | 2.57 | 0.5% |
| 1112 | 1.4 | 4.0 | 1% |
| 964 | 2.2 | 6.5 | 0.3% |
| 815 | 4.0 | 11.2 | 0.3% |

Note that the signal strengths are the sum of two sensors.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a borehole telemetry system having a transmitter for transmitting information in a form of a phase shift keyed signal, said signal being divided into a plurality of windows, each said window being offset in time, and a receiver for receiving said information, a demodulator comprising:

conversion means for converting said phase shift keyed signal into a plurality of successive outputs, each said successive output being representative of a phase and amplitude of said phase shift keyed signal over additional sets of windows and carrier phases, and each said additional set having different offsets in time and carrier phase from the other said additional sets;

estimation means for using said plurality of signals to estimate said carrier phase and said window offsets of said phase shift keyed signal, wherein said carrier phase and window offsets are synchronous; and decoding means for decoding said phase shift keyed signal back into digital data using said estimates.

2. In a borehole telemetry system having a transmitter for transmitting information in a form of a phase shift keyed signal divided into a plurality of windows, each said window being offset in time, and a receiver for receiving said information, a method for demodulation of said phase shift keyed signal comprising the steps of:

converting said phase shift keyed signal into a plurality of successive outputs, each of which is representative of a phase and amplitude of said phase shift keyed signal over additional sets of windows and carrier phases, each said additional set having a different offset in time and carrier phase from the other said additional sets of windows and carrier phases;

estimating the carrier phase and window offsets of said phase shift keyed signal using said plurality of successive outputs, said windows offsets and said carrier phase being synchronous; and decoding said phase shift keyed signal back into digital data using said estimates; and measuring a distribution of bit values received for a set of possible said window offsets and carrier phases and selecting a most likely said window offset and carrier phase.

3. A method in accordance with claim 2, wherein said most likely said window offset and carrier phase are selected by choosing those which maximize a sum of an increasing function of an absolute value of said bit values.

4. A method in accordance with claim 2, wherein said most likely said window offset and carrier phase are selected by choosing those which maximize a sum of the squares of bit values.

5. A method in accordance with claim 2, wherein said most likely window offset and carrier phase are selected by choosing those which maximize a sum of the absolute values of said bit values.

6. A method in accordance with claim 2, wherein said most likely window offset and carrier phase are selected by choosing those which minimize a bit error rate.

7. A method in accordance with claim 2, wherein said most likely window offset and carrier phase are selected by comparing a sum of the squares of said bit values to a theoretical value.

8. A method in accordance with claim 2, wherein said carrier phase is tracked by calculating a sum of the squares of said bit values for a small set of candidate window offsets.

9. A method in accordance with claim 8, wherein said small set of window offsets is adjusted by using the measured bit values.

* * * * *